Inventors
Richard M. Elliott
John L. Minto

Fig.3

United States Patent Office 2,827,705
Patented Mar. 25, 1958

2,827,705

APPARATUS FOR USE IN TENSILE TESTING

Richard M. Elliott and John L. Minto, Beverly, Mass., assignors to United Shoe Machinery Corporation, Flemington, N. J., a corporation of New Jersey Application May 12, 1954, Serial No. 429,203

6 Claims. (Cl. 33—147)

This invention relates to apparatus for testing materials and more specifically to apparatus adapted for use with a tensile testing machine to plot the true stress-elongation curve of a specimen while it is being pulled by the machine.

One of the standard ways of testing the physical properties of a metallurgical specimen is to subject a specimen of the material to a tension load and to measure the effect of such load on the specimen. Normally a specimen will comprise a turned section of material having enlarged end portions adapted to be gripped by the jaws of a tensile testing machine. During the progress of a pull, the jaws of the machine separate progressively and the elongation of the specimen between predetermined gage points on the original specimen may be measured. By plotting the elongation against the corresponding load, a load-elongation curve, sometimes called a stress-strain curve, may be plotted. During the first part of the pull, elongation increases substantially linearly with load until the elastic limit or yield point of the material is reached. Beyond this limit, deformation of the specimen enters what is known as the plastic range wherein elongation increases much faster with load than in the elastic range. As the pull of a specimen enters the plastic range, a drawn-down portion or "neck" commences to form on the specimen at the point where it will ultimately break, the neck decreasing rapidly in diameter until fracture occurs. To encourage the necking to take place between the gage points, the specimen is sometimes formed with a minimum diameter in this location as by polishing with emery cloth, but usually the exact location of the neck cannot be established in advance of the pull. Further, the position of the neck in relation to either of the gage points or to the machine may change lengthwise of the specimen during a pull.

Most commercial tests have involved only the graphing of load-elongation curves. For such purposes it has been common to use a two-axis recorder continuously to plot the load-elongation curve during a test. In the type of recorder shown herein, for example, the two axes comprise respectively a drum and a pen. In tracing a load-elongation curve, the position of the drum is controlled by an elongation detector or extensometer while the position of the pen is controlled by a load detector. An electro-mechanical translating device termed a differential transformer is provided in each detector to translate the quantitative data from terms of mechanical displacement to terms of the magnitude of an electric voltage. A servomotor is arranged to drive the drum until the voltage output of a differential transformer connected thereto balances the voltage from the elongation detector. Similarly, the pen is driven by another motor to balance the voltages from the load differential transformer and from a differential transformer connected to the pen. Such a follow-up system is shown in United States Letters Patent No. 2,451,757 Macgeorge.

However, for many purposes, because of the reduction of the cross section of the specimen during pulling, e. g., necking, the curve of true stress against elongation, which takes account of this reduction, is of greater interest than the load-elongation curve. The true stress, $S_t$, in a specimen represents the average stress across the minimum cross section. This stress is equal to the load divided by the cross-sectional area of the specimen at the plane of minimum diameter and thus is directly proportional to the load divided by the square of minimum diameter, i. e., $$S_t = \frac{4L}{\pi D^2} = \frac{KL}{D^2}$$

Such curves have been obtained in a variety of ways. For example, the pull of a specimen may be stopped periodically while the diameter is measured with calipers and noted in figures together with the elongation existing at that time. This data may be combined with load data either taken simultaneously with diameter or read from an autographically plotted load-elongation curve to obtain the true stress at predetermined values of elongation. These values may be plotted against elongation and a curve drawn through these points to provide a true stress-elongation curve. Alternatively, autographically recorded load-elongation and load-diameter curves may be converted to a true stress-elongation curve by reading the values of diameter and elongation at corresponding values of load, computing the true stress at such values and plotting the points so obtained against the elongation.

However, plotting the true stress-elongation curve either from numerical data or from one or more curves is slow and tedious and involves interpolation between the points computed. Also in using curves to obtain the data, error is introduced since the reading of curves is subject to errors such as the inherent range of error of the curve and the personal error where, for example, two persons may differ as to the value represented at a given point on a curve.

Accordingly, apparatus may advantageously be used comprising means for detecting quantitatively the minimum diameter of a test specimen, means for detecting quantitatively the load to which the specimen is being subjected, and a computer controlled by the diameter detecting means and by the load detecting means for controlling one axis of a two axis recorder continuously to record the true stress in the specimen. In the illustrative apparatus, the computer is arranged for controlling the position of the recorder pen to record the true stress while the position of the drum is controlled by an elongation detector in accordance with elongation, whereby the recorder is controlled to plot the true stress-elongation curve during the pulling operation.

As previously mentioned, when a neck forms on a specimen during the pulling cycle, the position of the neck may shift heightwise of the testing machine as the pull is continued. This fact, together with the fact that the neck may appear at an unexpected location on the specimen quite suddenly makes severe demands upon the diameter detecting device which must operate to pick up the diameter at the neck the moment it appears and wherever it appears and follow the neck until fracture.

Thus either wire wrap-around or roller-type diameter detecting devices are unsatisfactory because it is difficult to locate them in the first instance at the location where the neck will appear and because through friction they may not precisely follow the neck during continuation of the pulling cycle. Also where the wire of a wrap-around gage is attached to the machine, movement of the neck may introduce errors through pulling the wire out of line.

Accordingly an object of the present invention is to provide an improved diameter detector which will accurately detect quantitatively the minimum diameter of a test specimen along a predetermined portion of its length, which detector will not be subject to the foregoing disadvantages.

In accordance with the foregoing object, a diameter detector is provided comprising two blanks of cantilever fingers providing superposed calipering elements adapted to engage a specimen at opposite sides thereof, first and second relatively movable gage members each arranged to be positioned respectively by the innermost finger of one of said banks and an electro-mechanical translating device connected with said gage members for operation by relative movement thereof to provide an electric signal which varies in accordance with the spacing between the said innermost fingers of the respective banks.

Other features and advantages will be more apparent to those skilled in the art by the following description of the accompanying drawings in which.

Figures 1, 2:
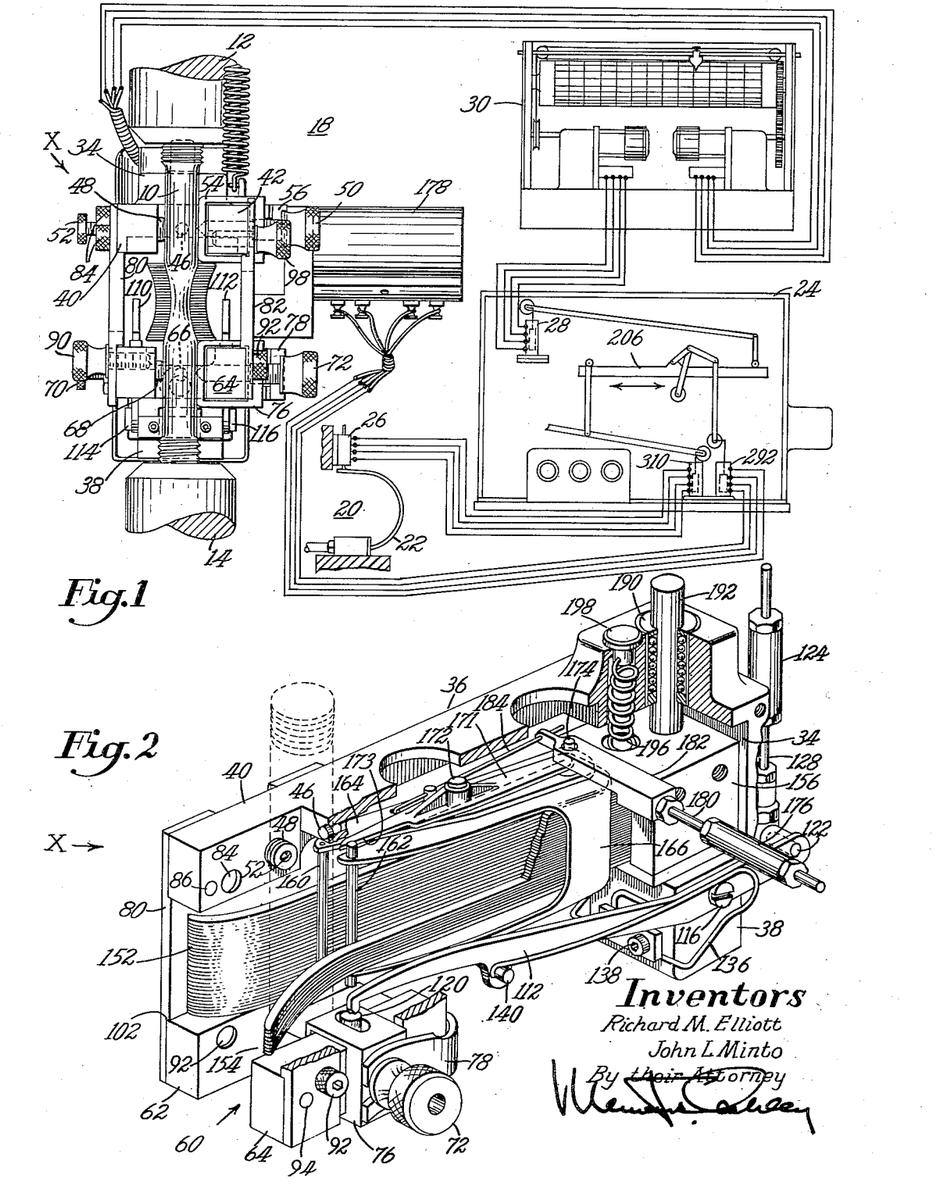
Fig. 1 is a diagram of apparatus, comprising diameter, elongation and load detectors, our improved computer, and a recorder, for recording the true stress-elongation characteristics of a specimen in accordance with the present invention. Incorporated in the diagram is a front elevation of our improved diameter-elongation detector.
Fig. 2 is an angular view, partly in section and somewhat enlarged, of the diameter-elongation detector shown in Fig. 1, certain parts having been broken away better to show the interior of the detector.

Fig. 1 illustrates the manner in which the apparatus of the present invention is employed in recording a true stress-elongation curve. A specimen 10 to be tested is chucked in the grips 12 and 14 of a testing machine, which may be of any conventional type, and our improved diameter-elongation detector, indicated generally by the numeral 18, is secured to the specimen. A load detector, indicated by the numeral 20, is connected with the testing machine to detect quantitatively the load applied to the specimen. As indicated in Fig. 1, the detector 20 comprises a Bourdon tube 22 which may be connected to the fluid pressure system of a hydraulic testing machine although other forms of load detectors may be employed, for example, a beam arranged to be deflected in proportion to the load.

Data on the minimum diameter of the specimen and data on the load applied to the specimen are translated into electrical terms and transmitted to a computer 24. For example in the load detector 20 a differential transformer 26 is operated by movement of the Bourdon tube 22 and is connected to provide an output voltage proportional to the displacement of the differential transformer core by the Bourdon tube. In the computer, the electrical data on load and diameter are reconverted to mechanical displacement of the cores of two differential transformers by a follow-up system similar to that shown in the aforementioned Patent No. 2,451,757 Macgeorge, while the displacements of the two cores are combined through a linkage hereinafter described in greater detail to cause a displacement of an output member proportional to the true stress in the specimen 10, thereby to provide an indication of the true stress. The displacement of the output member is translated into electrical terms by a differential transformer 28 which may be connected to a recorder 30 as shown to control the position of the recorder pen in accordance with the displacement of the output member of the computer 24 to record the true stress. To record true stress against elongation, the drum of the recorder 30 is connected to be positioned in accordance with the electrical data supplied from the elongation detector element of the detector 18. The recorder itself is a standard commercial item and will not be described herein with any degree of particularly. We have found a Baldwin type MD2 recorder satisfactory for the purpose.

Referring to Figs. 1, 2, 3 and 4, the diameter-elongation detector comprises a main frame 34 which in side elevation is formed substantially in the shape of the letter J. When the detector is in its operating position, the long leg 36 of the frame extends horizontally above the short leg 38. The outer end of the leg 36 is bifurcated to receive a test specimen between upper gage points carried by furcations 40, 42 and against a flat-headed base pin 46 press fitted into the leg 36 at the base of the furcations.

The upper gage points are provided by two screws 48 and 50 which pass through the said furcations. The screw 48 is hollow and is threaded through the furcation 40, being normally held fixed by a lock nut 51. Through the screw 48 is threaded a smaller screw 52 having at one end a knurled knob and at the other end a hardened point, thereby providing a retractable point to the fixed gage point screw 48. The screw 50 passes freely through a hole in the other furcation while threadedly engaging a rectangular collar 54 (Fig. 4) on the latter furcation. Lateral clearance provided in the collar 54 allows a small amount of transverse movement of the collar on the furcation 42 to accommodate any reduction of diameter of the specimen at the gage points during a pull. The collar 54 is spring loaded inwardly by a spring 56. By this arrangement, it will be seen that if the gage point screw 50 is initially screwed in against the specimen until the collar 54 is pressed outwardly against the furcation, the screw may move inwardly with the collar under the force of the spring 56 to maintain clamping pressure when the specimen suffers such a reduction in diameter.

The lower gage points are carried on a U-shaped yoke 60 (Fig. 2) having arms 62 and 64 corresponding in position to the furcations 40, 42. The yoke 60 carries a base pin 66 (Fig. 3) corresponding to the base pin 46, a fixed gage point screw 68 (Fig. 1) similar to the screw 48 and having a retractable point provided by a smaller screw 70, and a spring-loaded gage point screw 72 corresponding to the upper gage point screw 50. The screw 72 passes freely through a hole in the arm 64 on which a rectangular collar 76 is mounted for limited transverse movement, the screw 72 being threaded through the collar 76. A spring 78 (Fig. 2) normally biases the collar 76 in its inward position.

When the detector 18 is assembled and ready to be clamped to a specimen, the yoke 60 is yieldingly secured to the frame 34 by two H-shaped side plates 80 and 82 each having upper and lower pairs of arms. The plate 80 is permanently attached at its upper arms to one furcation 40 by two Allen-head screws 84 and two dowel pins 86, one pair being shown in Fig. 2. The yoke 60 is adapted to be slidably attached to the plate 80 by a shouldered pin 88 and a knurled thumb screw 90 which cooperate with vertical slots in the lower arms. On the other side of the yoke 60, the plate 82 is symmetrically arranged, being attached permanently to the yoke by two Allen-head screws 92 and two dowel pins 94 and being slidably attachable at its top to the furcation 42 by a shouldered pin 96 and a thumb screw 98. In use, the shouldered pins 88 and 96 are normally tightened sufficiently to provide a sliding fit and are retained in this adjustment by setscrews 100 (Fig. 3), the final clamping action being adjusted by the thumb screws 90 and 98. The yoke 60 is attached to the frame 34 by intermeshing the slots of the side plates with the shouldered pins 88 and 96 and with the thumb screws 90 and 98 and sliding the parts together until a shoulder 102 on each side plate engages that one of the yoke 60 or frame 34 with which the side plate has relative movement.

The assembled detector 18 is attached to a test specimen with the screws 52 and 70 retracted so that the specimen may bear, not only against the base pins 46 and 66, but also against the flat-ended gage point screws 48 and 68. The gage point screws 50 and 72 are thereupon screwed up until the collars 54 and 76 reach their outward limit of travel and the screws 50 and 72 bite into the specimen approximately 15 to 20 thousandths of an inch, or sufficiently to obtain a good grip. Thereafter the retractable point screws 52 and 70 are tightened to provide a similar grip at the other side of the gage points. Then the thumb screws 90 and 98 are loosened so that as the specimen is pulled, the yoke which is attached thereto at the lower gage points can move freely, but only in a direction parallel to the specimen axis.

Figure 3:
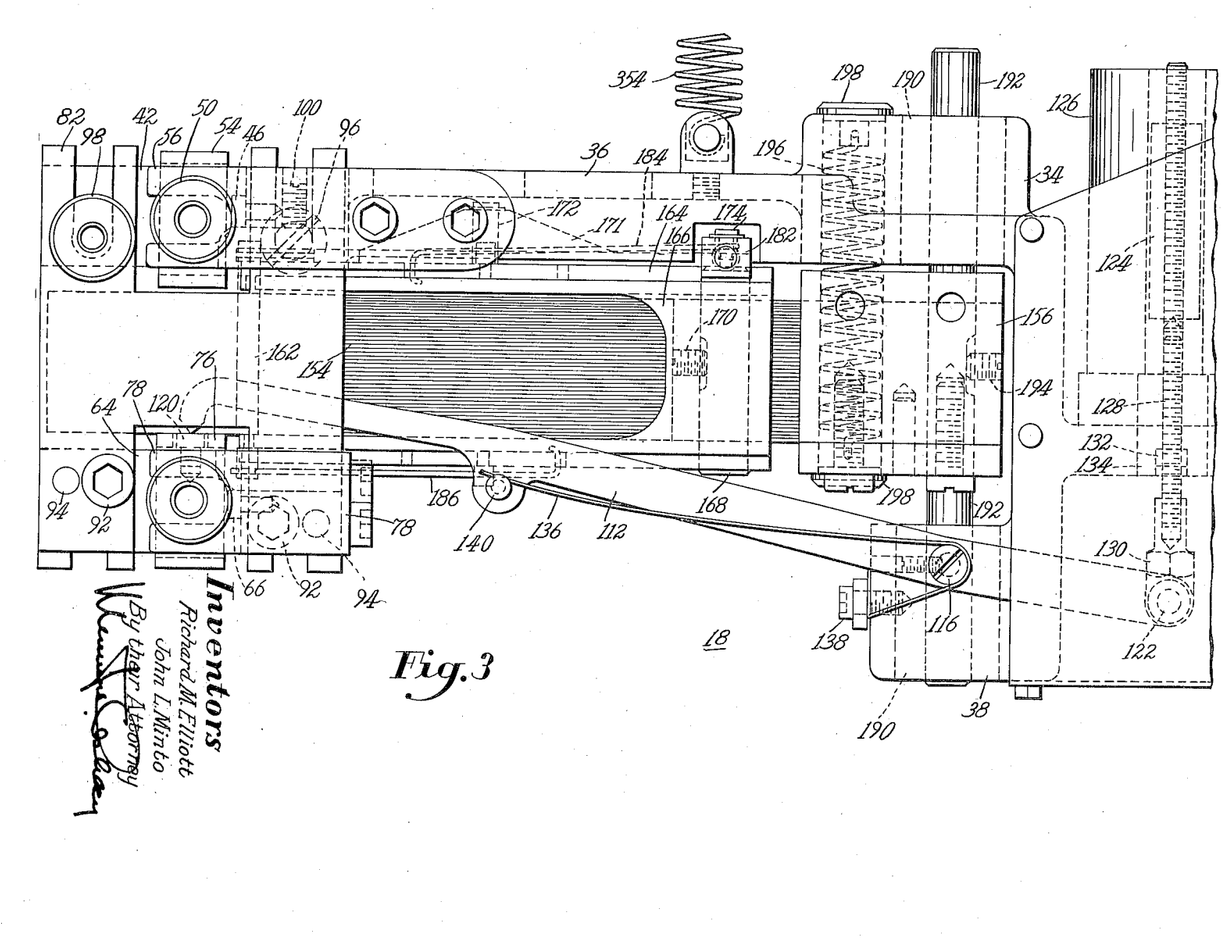
Fig. 3 is a side elevation, further enlarged, of the detector shown in Fig. 2.

The separation of the yoke from the furcation 40, 42 under the pull of the testing machine will be seen to equal the elongation of the specimen between the gage points. To detect the elongation quantitatively, two elongation pick-up levers 110 and 112 are pivoted on opposite sides of the leg 38 upon screws 114 and 116 respectively. One end of each of the levers 110 and 112 is curved downwardly and beveled to provide edges which contact gage pins 118 and 120 respectively. These pins are inserted in the top surface of the arms of the yoke at opposite sides of the specimen axis. The other ends of the levers 110 and 112 are pivotally connected to a transverse rod 122 to the center of which the core 124 of a differential transformer 126 is pivotally attached through a threaded rod 128 and a pivot 130 (Fig. 3). The differential transformer 126 is itself attached to the frame 34 by screws 132 which engage a boss 134 of the frame. A spring wire 136 (Fig. 2) is secured at its center to the leg 38 of the frame by screws 138 and is formed so that its ends press downwardly upon pins 140 carried by and projecting laterally from the levers 110 and 112 so that these levers are biased into engagement with their corresponding gage pins 118, 120 in the yoke. Accordingly, as a specimen is stretched, the movement of separation between the yoke 60 and the frame is transmitted to the core 124 of the differential transformer 126. As explained in the aforementioned United States Letters Patent No. 2,451,757, such movement of the core is effective to vary the coupling between a primary winding and two secondary windings whereby the mechanical displacement of the core may be translated into terms of the magnitude of an electrical signal.

Figure 4:
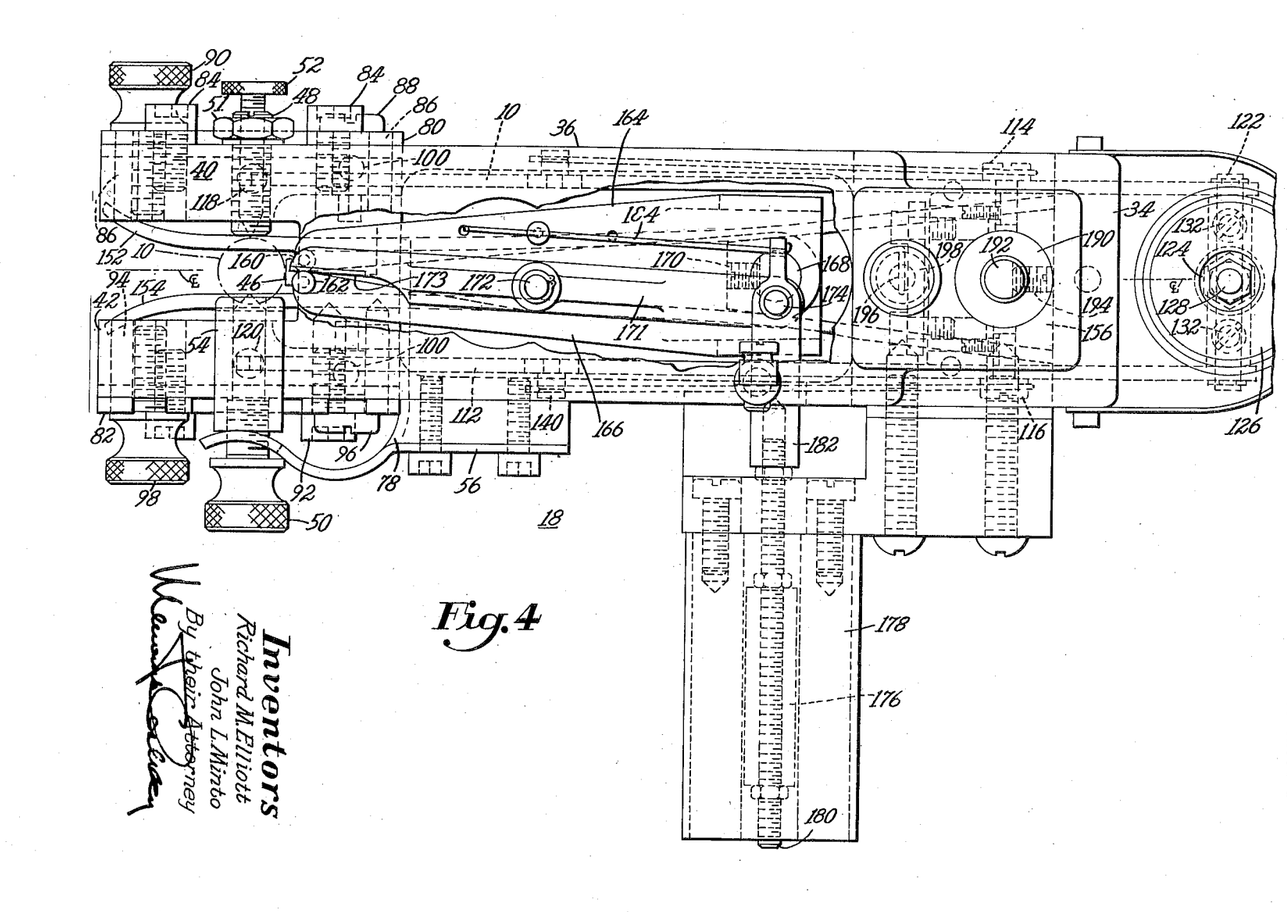
Fig. 4 is a plan view of the detector drawn to the same scale as Fig. 3.

The diameter detecting elements of the detector 18 comprise a plurality of cantilever fingers arranged in two banks 152, 154 with their ends secured in deep slots formed in a block 156 and retained therein by a base plate 158, Fig. 3. The fingers are elongated thin, narrow strips of resilient material and are normally straight throughout their length except for a short portion at their free end wherein they are bowed slightly outward to facilitate the insertion of a test specimen between the banks. The retaining slots are spaced and arranged at an angle such that at minimum specimen diameter the fingers will bear against the specimen with adequate pressure while at the diameter half way between maximum and minimum, the portion of the fingers engaging the specimen will be approximately parallel to the line ₵ (Fig. 4).

It is necessary, of course, for the fingers of the banks to be free to move independently inwardly to engage the specimen. To insure such freedom of the fingers, a slight spacing should be provided between the fingers in the unsupported portion of their length. This may be provided by thin plating of the fixed ends of the fingers, but we prefer to separate the fingers at their fixed ends by interlacing the ends with a strip of aluminum foil having a thickness of about .0005 inch and a width approximately equal to the length of the slot in the block 156. The foil or plating should not extend beyond the slots as otherwise the fingers will not have the same effective length when bent. When a specimen is inserted between the banks at the free ends of the fingers, the sides of the fingers engage the specimen and project the profile of the specimen along the fingers in true proportion, that is, a cross-section of the fingers at a location rearward toward the block 156 from their point of engagement would reveal the outline of the specimen to a predetermined scale. When a test specimen is between the banks of fingers, the fingers will be curved from the block to the specimen although, because of the leverage, most of the bending takes place near the block and the curvature adjacent to the specimen is very small. The position of the fingers at a predetermined location just rearward of the specimen may be considered to change linearly with the diameter of the specimen.

To detect the spacing between the innermost fingers of the banks 152 and 154 at a location adjacent to and just rearward of the specimen, two sensing rods 160 and 162 are supported respectively on U-shaped arms 164 and 166. The arms 164 and 166 are pivotally mounted on a pin 168 extending heightwise of the banks of fingers through a central forwardly projecting portion of the block 156 and retained by a setscrew 170. The upper and lower legs of the arms restrict the vertical separation of the free ends of the fingers as shown in Figs. 3 and 4 to avoid formation of gaps between the fingers in the necking area. To add the motions of the two sensing arms, an adding lever 171 is pivotally attached to the upper leg of the arm 164 by a pivot pin 172 half way between the point of engagement of a straight edge 173 of the lever 171 with an upstanding portion of the sensing rod 162 and a pivot pin 174 of a drive link 182, the core 176 of a differential transformer 178 connecting to the rear end of the arm 171 through a threaded rod 180. A wire spring 184 is mounted on the arm 164 and is arranged to exert a pull (upward in Fig. 4 on the link 182) so that the straight edge 173 is pressed lightly against the upstanding portion of the sensing rod 162. This pressure biases the rod 162 against bank 154 while the reaction on arm 164 biases the rod 160 against the bank 152. It will be seen that outward movement of either arm 164, 166 will permit counterclockwise rotation of the arm 171 and cause movement of the pin 174 and hence of the core 176 (upward in Fig. 4) by an amount equal to the outward movement of the sensing rod on that arm. Accordingly, independent movement of separation of the sensing rods 160, 162 is added and transmitted in true proportion to the differential transformer 176 whether the movement is caused by the movement of one or both of the sensing rods. A spring 186 also mounted on arm 164 at the bottom thereof bears against a lower extension of the rod 162 to urge the arms 164 and 166 outwardly in balancing assistance with the force provided by the spring 184. The combined force of the two springs 184 and 186 in urging the sensing rods against the banks 152 and 154 must be adjusted with considerable care, for this force must be sufficient to carry the rods outwardly against the innermost fingers and yet light enough so that the pressure will not have the effect of appreciably changing the configuration of the innermost finger of each bank. This pressure is considerably less even than the pressure which suffices to lift the innermost finger away from engagement with the specimen. In order for the diameter detector elements to be free to move vertically and follow the neck as it moves relative to the main frame 34, these elements are supported within the frame upon ball bearing axial ways 190 in which a rod 192 is mounted for vertical movement. The rod 192 is fitted through a hole in the block 156 and retained therein by a setscrew 194 which engages a flat on the rod 192. The block 156 is suspended between the legs 36 and 38 of the frame 34 by a spring 196 which is received in vertically disposed holes in the frame and in the block and held in place by caps 198.

The diameter data from the diameter-elongation detector and the load data from the testing machine are transmitted to the computer 24 by differential transformers. The computer operates to provide an output quantity in the form of the magnitude of displacement of an output element, which displacement is proportional to the magnitude of the load divided by the square of the magnitude of the minimum diameter and determines the true stress from these data and transmits it to the recorder by differential transformers.

In principle, the computer is a straight lever with a movable fulcrum between the two ends, such that a variable lever ratio, i. e., of the lengths of the input and output arms, can be obtained. By displacing one end of the lever in accordance with the magnitude of one quantity P, and by varying the lever ratio in accordance with a predetermined function F(n) of a second quantity, the displacement of the other end of the lever will be proportional to a third quantity $$S = \frac{P}{F(n)}$$

For this particular application, $$F(n) = Kd^2 \qquad (2)$$

where $d$=the instantaneous minimum diameter of the test specimen.

Figure 5:
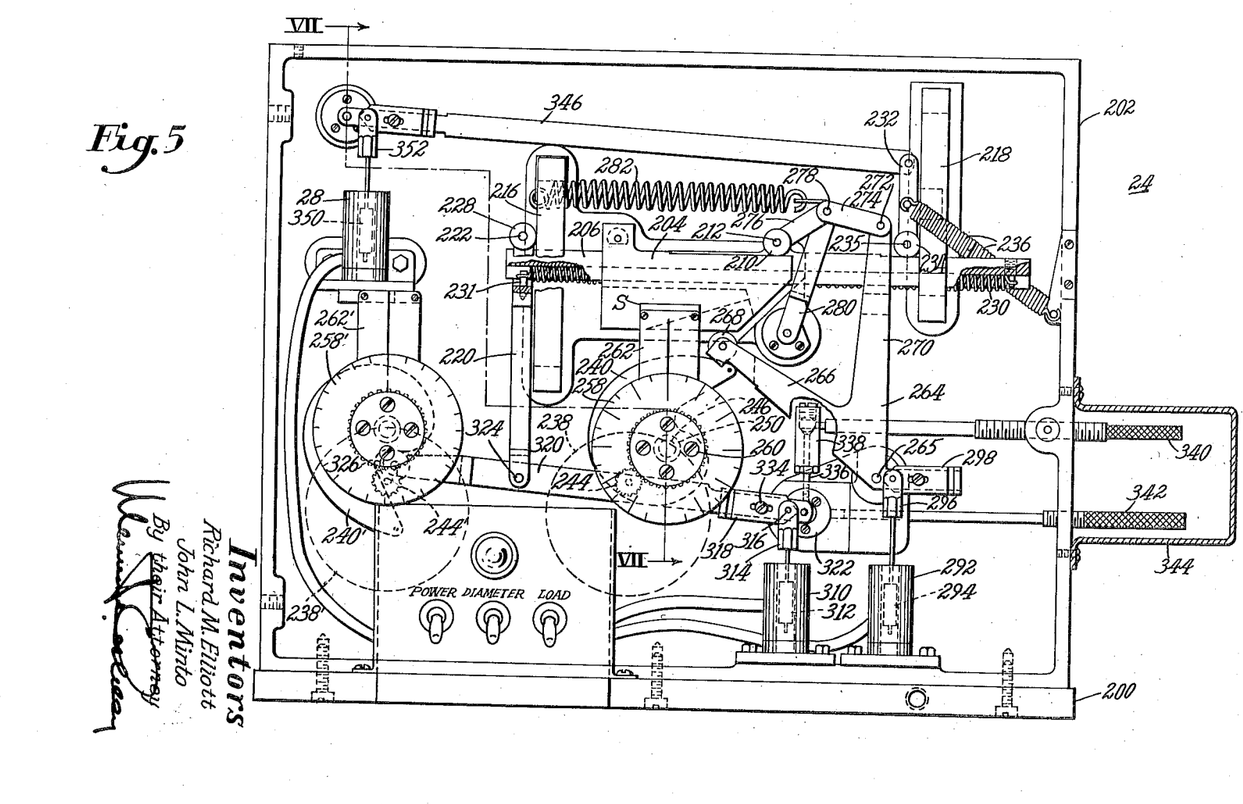
Fig. 5 is a front elevation of our improved computer having its front cover removed to show the interior arrangements.
Figures 6, 7:
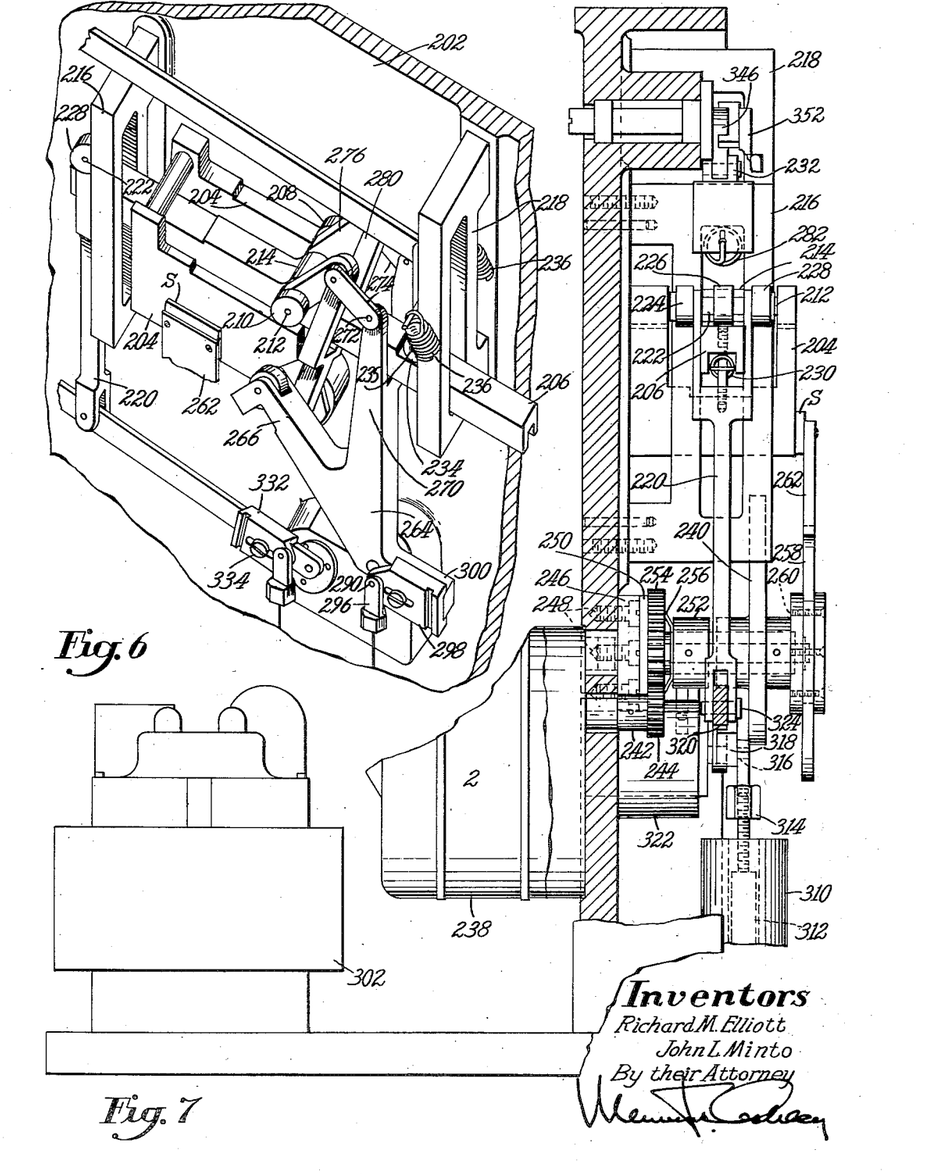
Fig. 6 is a diagrammatic angular view of the computer shown in Fig. 5.
Fig. 7 is a section taken on line VII—VII of Fig. 5 and on a larger scale.

Referring to Figs. 5, 6 and 7, the computer 24 has a main frame comprising a horizontal plate 200, and a vertical casting 202 which in addition to supporting elements of the computer serves to separate the mechanical elements from the electrical elements. The casting 202 supports a pair of horizontal guide rails 204 upon which the main lever 206 of the computer is supported by rollers 208 and 210 (Fig. 6) for horizontal movement of translation. The rollers are precision ball bearings and are mounted on an axle 212 press-fitted through a hole in a boss 214 on the top of the main lever 206.

The casting 202 also supports two pairs of vertical rails 216 and 218. The members of each pair are spaced just sufficiently to permit the lever 206 to pass snugly between them.

A vertically-disposed link 220, forming part of a load input linkage hereinafter described, has a bifurcated upper end. This end carries the load input member, an assembly comprising an axle 222 on which are mounted three ball bearing rollers 224, 226 and 228 (Fig. 7) of which the center one, 226, is adapted to engage the top surface of the main lever 206. The other two rollers are held in engagement with the flat vertical running surfaces of the two rails of pair 216 by a spring 230, one end of which is connected to the lever 206 near its right end while the other end of the spring is connected to a stud 231 in the top end of the link 220. This spring also serves to take up backlash in a diameter linkage hereinafter described.

A vertically-disposed link 232, forming part of an output linkage, has a bifurcated lower end carrying the output member, an assembly comprising an axle 235 on which are mounted three rollers of which only the outer roller 234 is shown in Figs. 5 and 6, corresponding to the rollers of the load input assembly. Two springs 236, each having one end connected to the casting 202 while the other end is connected to the link 232, exert a pull on the link in a direction tending to hold the center roller down on the lever 206 and the other rollers against the running surface of the vertical rails 218. Thus the fulcrum center of the main lever 206 and the axes of the load input and output members always remain in a straight line which actually may be considered as the effective computing lever.

From the above, it will be seen that a vertical displacement of the load input member is effective to produce a vertical displacement of the output member in a ratio of magnitude, the lever ratio, herein meaning the length of the input arm divided by the length of the output arm, which depends on and is inversely proportional to the horizontal position of the fulcrum of the lever 206 relative to the input and output axles 222 and 235.

The load input linkage and the diameter input linkage hereinafter described are each operated by a servo system. The drive elements of the two systems are similar and it will be understood that primes indicate elements of the load input linkage drive system which correspond to elements of the diameter input linkage drive system.

The diameter drive comprises an electric motor 238 which is connected to rotate a uniform rise cam 240. The motor, which is attached to the rear of the casting 202, has a shaft 242 which projects forwardly through a hole in the casting and carries a pinion 244. A stub shaft 246 is secured to the casting 202 by screws 248. Concentric with the stub shaft 246 is a hollow shaft 250 having a flat base. To shaft 250 are fixed a collar 252 and the cam 240. Loose on the shaft 250 are a gear 254, which engages the pinion 244, and a spring clip 256, the ends of which engage the gear 254. The gear and clip are jammed by the collar 252 against the base of the shaft 250 to provide a friction connection between the motor and cam. Accordingly, the motor 238 is operative to rotate the cam 240 while at the same time the friction connection between the motor and the cam prevents any damage from possible overdrive.

A dial 258 marked with the diameter scale is attached to the cam 240 by screws 260 and cooperates with a plate 262 marked with a reference line for reading the dial.

The diameter input linkage comprises a V-shaped rock lever 264 pivoted to the casting 202 at 265. One arm 266 of the lever 264 carries at its end a ball bearing 268 adapted for engagement with the cam 240. The end of the other arm 270 of the lever 264 is bifurcated, the furcations passing on either side of the lever 206 and having their distal ends connected to a transverse axle 272 in common with one end of the first, 274, of two sets 274, 276 of links which are interconnected by another transverse axle 278 to form a toggle. The ends of the links 276, opposite to the ends connected by the axle 278, are connected to the axle 212. The path of movement of the axle 278 is confined to an arc by an arm 280, one end of which is connected to the said axle while the other is pivoted to the casting 202. A spring 282 is connected between the vertical rails 216 and the axle 278 and provides a force tending to move said axle toward the left and to press the rollers 208 and 210 down on the horizontal rails 204. Accordingly, referring to Fig. 5 it will be seen that as the cam 240 is rotated clockwise from its illustrative position, the lever 264 may swing counterclockwise about its pivot to permit the lever 206 and its fulcrum to shift bodily to the left.

To provide means for controlling the computer to position the fulcrum in accordance with the diameter data from the diameter detector 18, a diameter follow-up differential transformer 292 is mounted on the casting 202 and has its core 294 connected to the lever 264 through a drive link 296. The link 296 is pivoted upon a pin 290 (Fig. 6) on a member 298 which is slidably adjustable on a short arm 300 of the lever 264.

The transformer 292 is connected to a servo-amplifier 302 (Fig. 7), and provision is made for connecting to the amplifier 302 the output of an external differential transformer such, for example, as the transformer 178 (Fig. 4), in such a manner that the outputs of the two transformers are balanced against each other to provide an error voltage when their cores are out of coincidence. During operation the amplifier 302 is connected with the motor 238 and the transformers in the manner illustrated in the above-mentioned Patent No. 2,451,757, Macgeorge, to operate the motor in the proper direction to bring the cores into coincidence. When so connected, the core 294 is arranged to be positioned heightwise throughout a range of positions corresponding to that of the core 176. Within a predetermined range of movement, the position of the core 176 corresponds with a predetermined value of diameter, and accordingly the core 294 may be considered as an input element whose position in its range during operation is varied linearly with, i. e., as the first power of, the value of a second variable, namely diameter.

The function of the connecting means between the input element and the fulcrum of the main lever 206, that is, the diameter input linkage between the core 294 and the axle 212, is to vary the position of the fulcrum with variations in the position of the input element so that the lever ratio is varied in proportion to the square of the value of the second input variable represented linearly by the position of the input element, in accordance with Eq. 2.

The diameter input linkage above described may be employed to perform this function, using the following relative unit dimensions:

Horizontal spacing of paths of input and output
 members (or of vertical rails 216 and 218)_____ 7.500
Length of arm 270 pivot to toggle (at axle 272)___ 5.000
Length of arm 280, pivot to toggle at interconnection of links_________________________________ 2.600
Length of each of links 274 and 276 (connection to connection)_______________________________ 1.125
Pivot 265 of arm 270 is:
 Below axle 212 (or distant from path of movement of main lever pivot)_______________ 4.625
 Left of axle 235 (or distant from path of movement of output member)_____________ .500
Pivot of arm 280 is:
 Below axle 212 (distant from path of movement of main lever pivot)_______________ 1.831
 Left of axle 235 (or distant from path of movement of output member)_____________ 2.338
The value of diameter represented by the position of the arm 270 when vertical_______________ $D_M$
The value of diameter represented by the position of the arm 270 when swung counterclockwise until axle 272 is neither above nor below axle 212_______________________ 60% $D_M$ Between $d=60\% \ D_M$ and $d=D_M$, $d$ increases linearly with movement of axle 272 to the right and hence linearly with vertical movement of core 294.

In the illustrative computer, $D_M=.357$ and $$K=\frac{2}{(.357)^2} \text{ in Eq. 2}$$

To control the computer to position the load input member in accordance with load data, a differential transformer 310 is mounted on the casting 202 and has its core 312 connected through a drive link 314 and a pin 316 to a member 318 fixed in slidably adjustable position on a lever 320 pivoted at one end on an eccentric bearing 322 affixed to the casting 202. The link 220 is attached to the lever 320 intermediate its ends by a pin 324, while the other end of the lever carries a ball bearing adapted to engage a cam 240' of the load drive mechanism referred to above. It will be understood from the foregoing description of the diameter drive mechanism that in operation a motor 328' will position the cam 240' to move the lever 320 until the core 312 is in correspondence with the core of the external differential transformer such as that indicated at 26 in Fig. 1.

By loosening a screw 334 the position of the member 318 on the load lever 320 may be changed to adjust the load scale factor. To adjust the zero position of the core 312 to that of any given load detector, provision is made for turning the eccentric bearing 322 to raise or lower the pivot of the arm 320 slightly. For this purpose an arm 336 extending from the bearing 332 is connected by a ball and socket joint 338 to a rod 340 which threads through the side of the casting 202. Rotation of this rod 340 is effective to move the ball and socket joint 338 toward or away from the right-hand side of the casting 202, thereby to turn the bearing 322. The bearing may be locked in position by turning a second rod 342 extending through the casting 202 beneath the rod 340. The projecting knurled ends of the rods 340 and 342 are normally covered by a removable housing 344.

The output link 232 is connected to one end of an output arm 346 pivoted at its other end to the casting 202. From this arm, true stress data may be transmitted by the differential transformer 28 whose core 350 is connected to the arm 346 near the pivot by a drive link 352 connected to an adjustable pin similar to that on the arm 320 so that the core 350 moves linearly with the stress output member.

When the apparatus of the present invention is employed with a testing machine and a two-axis recorder to trace a stress elongation curve during a pull test, the first step after the specimen is chucked into the machine is to attach the diameter-elongation detector to the specimen as previously described. When properly attached, the fingers of the two banks 152 and 154 should engage the specimen substantially at its center. The whole detector may be hung suspended on a spring 354 (Fig. 3) so that it is not dependent upon the specimen for support. The diameter differential transformer is suitably connected to the diameter servo system of the computer while the differential transformer of the load detector is connected to the load servo system. The output differential transformer of the computer is connected to one axis of a suitable recorder while the elongation differential transformer 126 is connected to the other axis. Thereafter, provided all the circuits are appropriately energized, the testing machine may be operated normally and the recorder will plot the graph of the true stress-elongation curve.

Having thus described our invention, what we claim as new and desire to secure by Letters Patent of the United States is:

1. In apparatus for tensile testing specimens having a circular cross-section, two banks of superposed calipering elements each having a movable portion biased toward the corresponding portion of the other bank, said portions having straight work-engaging edges, a gage member for each bank, and means biasing each of said gage members toward the inner surface of the associated bank and into engagement with the innermost of said straight edges adjacent to the specimen whereby said gage members are spaced in accordance with the minimum diameter of the specimen.

2. In apparatus for detecting the minimum diameter of tensile testing specimens having a circular cross-section, two banks of superposed calipering elements arranged for engagement with opposite sides of a work piece, the elements of each bank being mounted for individual yielding movements toward and away from the corresponding elements of the other bank, a gage member for each bank, means for biasing each of said gage members toward the inner surface of the associated bank, and an electro-mechanical translating device connected with said gage members for operation by relative movement thereof to provide an electric signal which varies in accordance with the spacing between the innermost element of each of said banks.

3. In apparatus for tensile testing specimens having a circular cross-section, two banks of superposed calipering elements arranged for engagement with opposite sides of a work piece, the elements of each bank being mounted for individual yielding movements toward and away from the corresponding elements of the other bank, means for biasing corresponding elements of the banks toward each other, a gage member associated with each of said banks, means for biasing each of said gage members toward the inner surface of the associated bank, and an electro-mechanical translating means connected with said gage members for operation by relative movement thereof to provide an electric signal which varies in accordance with their spacing.

4. In apparatus for tensile testing specimens having a circular cross-section, two banks of elongated resilient cantilever fingers providing superposed calipering elements adapted to engage a specimen at opposite sides thereof, and a gage member for each bank, means for biasing each of said gage members toward the inner surface of the associated bank, whereby said gage members are positioned in accordance with the spacing of the innermost fingers of each bank.

5. In apparatus for tensile testing specimens having a circular cross-section, two banks of elongated resilient cantilever fingers providing superposed calipering elements arranged for engagement with opposite sides of a work piece, the fingers of each bank being normally spaced from one another in the unsupported portion of their length, a gage member associated with each of said banks, means for biasing each of said gage members toward the inner surface of the associated bank, and an electro-mechanical translating device connected with said gage members for operation thereby to provide an electric signal varying with their spacing.

6. In apparatus for tensile testing, a support, two banks of elongated resilient cantilever fingers fixed in said support, said fingers being arranged to engage opposite sides of a work piece, two arms each mounted on said support for pivoting on an axis extending heightwise of said banks, a rod mounted on each arm and extending between the banks parallel to said axis, means for biasing said arms to urge each rod into engagement with one of said banks, a translating device, and means connecting said device with said arms for operation by relative movement thereof to provide a signal which varies in accordance with the spacing of said rods.

References Cited in the file of this patent

UNITED STATES PATENTS

| | | |
|---|---|---|
| 2,019,313 | Lewis | Oct. 29, 1935 |
| 2,028,503 | Doherty | Jan. 21, 1936 |
| 2,096,032 | Engel | Oct. 19, 1937 |
| 2,229,156 | Wertheimer | Jan. 21, 1941 |
| 2,317,293 | Newell | Apr. 20, 1943 |
| 2,562,749 | Speer | July 31, 1951 |
| 2,612,774 | Zener | Oct. 7, 1952 |
| 2,672,049 | Hallendorff | Mar. 16, 1954 |